Jan. 6, 1925.　　　　　　　　　　　　　　　　1,522,371
R. P. KERR
ENGINE PISTON AND CROSSHEAD THEREFOR
Filed Dec. 18, 1922　　　6 Sheets-Sheet 1

INVENTOR:
ROBERT P. KERR,
By Spear, Middleton, Donaldson & Hall
Attys.

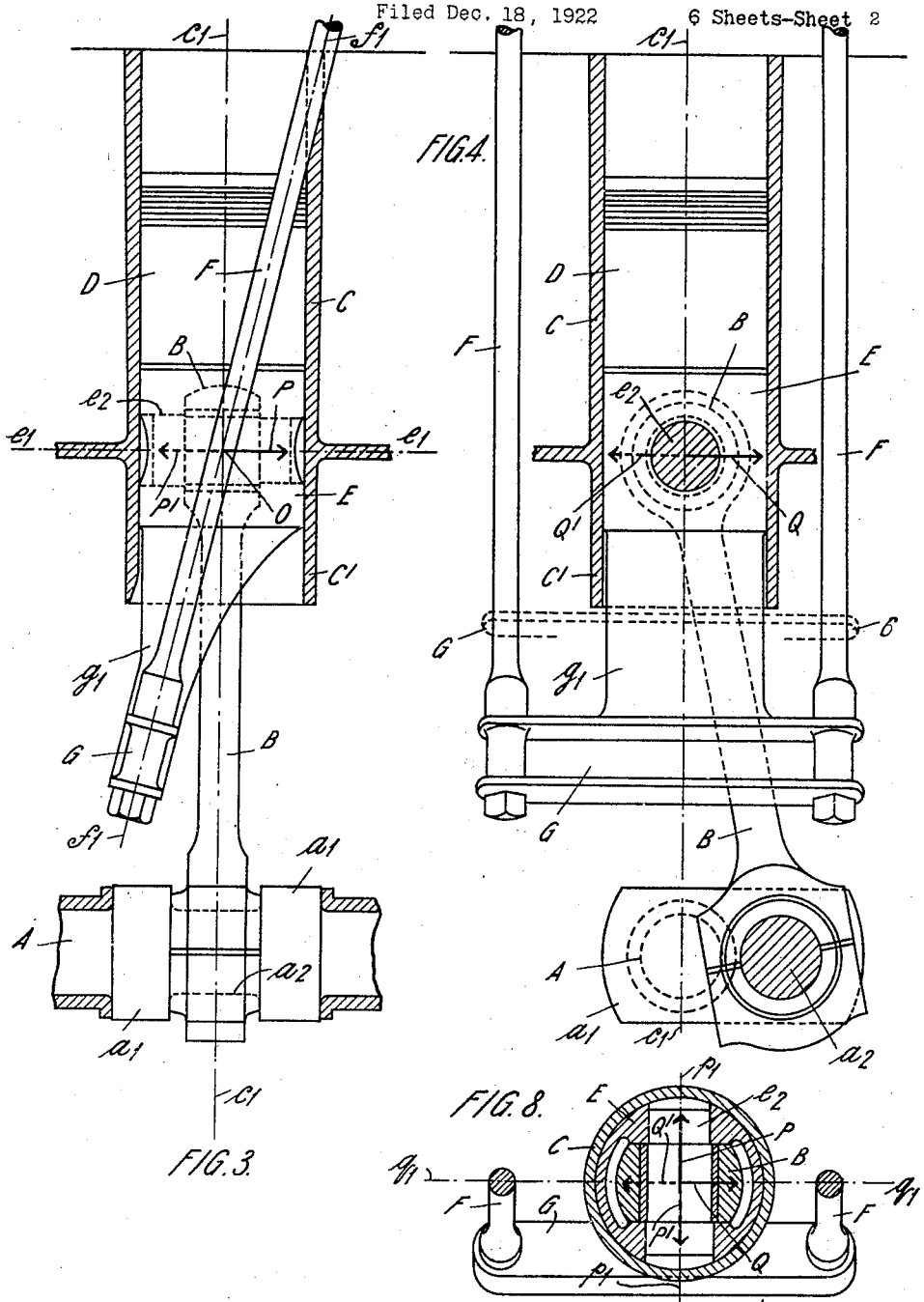

Jan. 6, 1925.

R. P. KERR 1,522,371

ENGINE PISTON AND CROSSHEAD THEREFOR

Filed Dec. 18, 1922     6 Sheets-Sheet 3

INVENTOR:
ROBERT P. KERR,
by Spear, Middleton, Donaldson Hall
Attys.

Jan. 6, 1925.　　　　　　　　　　　　　　　　　1,522,371
R. P. KERR
ENGINE PISTON AND CROSSHEAD THEREFOR
Filed Dec. 18, 1922　　　　6 Sheets-Sheet 4
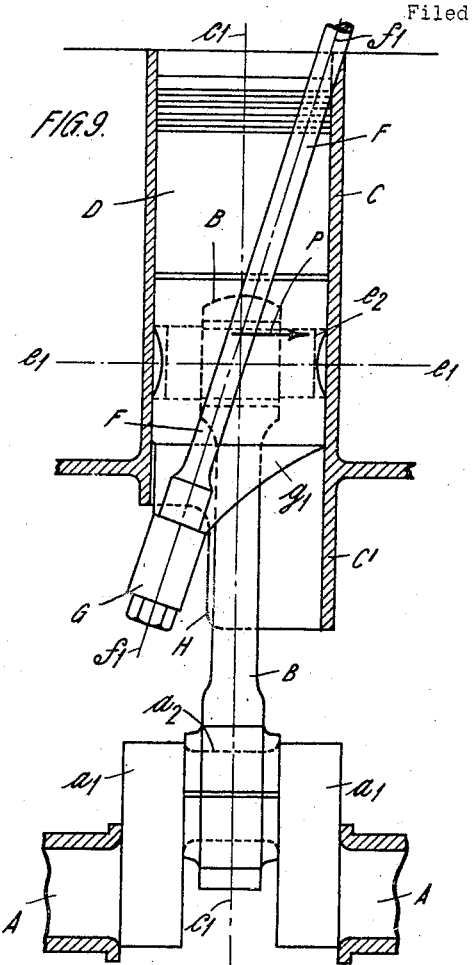
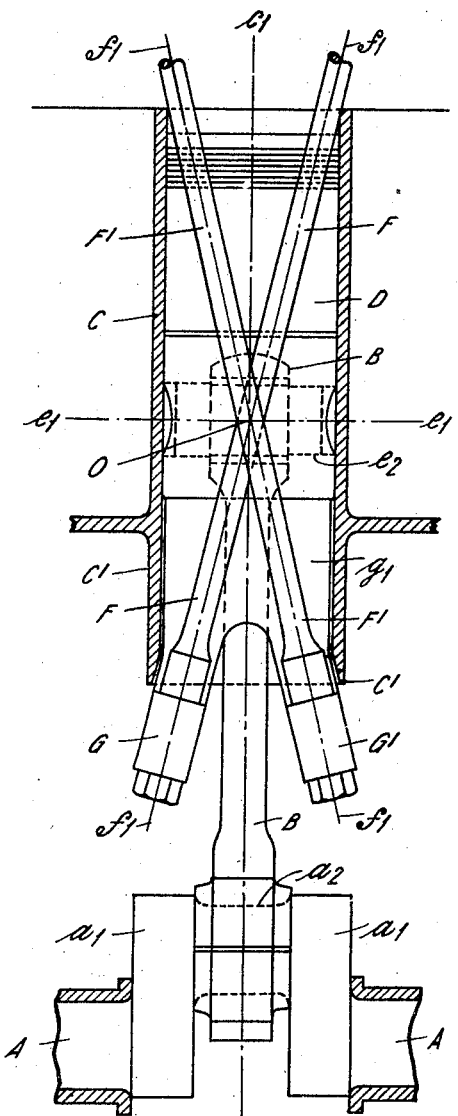
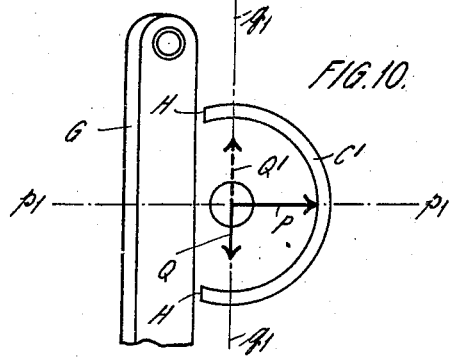
INVENTOR:
ROBERT P. KERR.
by Spear, Middleton, Donaldson & Hall.
Attys.

Jan. 6, 1925.
R. P. KERR
1,522,371
ENGINE PISTON AND CROSSHEAD THEREFOR
Filed Dec. 18, 1922     6 Sheets-Sheet 5
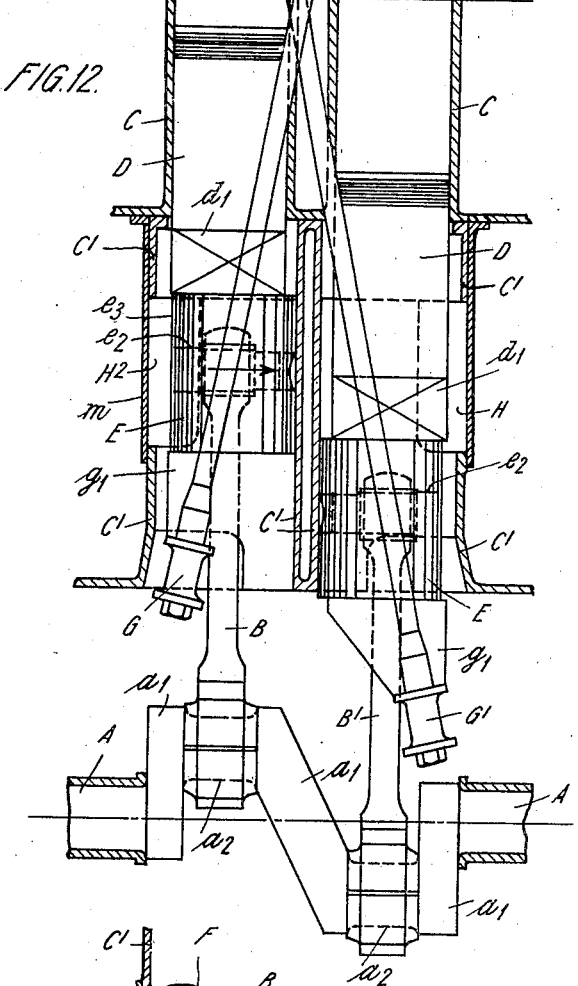
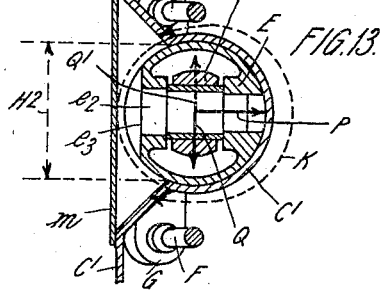
INVENTOR:
ROBERT P. KERR.

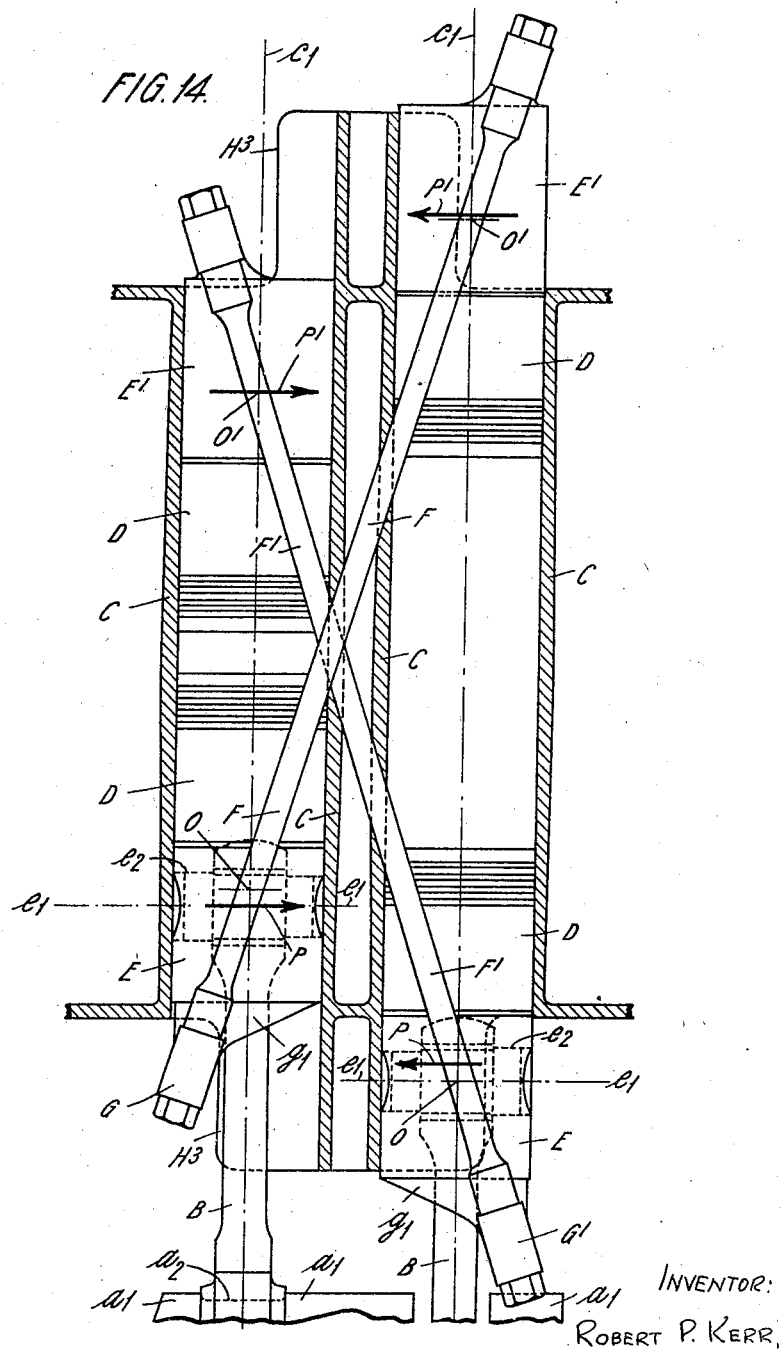

Patented Jan. 6, 1925.

1,522,371

UNITED STATES PATENT OFFICE.

ROBERT PRICE KERR, OF GATESHEAD-ON-TYNE, ENGLAND.

ENGINE PISTON AND CROSSHEAD THEREFOR.

Application filed December 18, 1922. Serial No. 607,754.

*To all whom it may concern:*

Be it known that I, ROBERT PRICE KERR, a subject of the King of Great Britain, and residing in Gateshead-on-Tyne, in the county of Durham, England, have invented certain new and useful Improvements Relating to Engine Pistons and Crossheads Therefor, of which the following is a specification.

This invention relates to engine pistons and cross-heads therefor, and has reference more particularly to engines having pistons which in addition to being connected by a main connecting rod to a crank, also require to be connected to another moving part, as for example in the well known Fullagar engine, in which each lower piston requires to be connected by a connecting rod to its crank, and to be connected by oblique side rods to the upper piston in a laterally adjacent cylinder; in this case it will be seen that the plane containing the two oblique side rods is normal to the plane in which the axis of the main connecting rod oscillates and that therefore the line of action of the centre of pressure on the guide surfaces due to the obliquity of the side rods is located in a plane at right angles to the plane containing the line of action of the centre of pressure on the guide surfaces due to the obliquity of the main connecting rod; and that whilst the magnitude of the latter pressure due to changes in the obliquity of the oscillating connecting rod varies from practically zero values at the ends of the stroke of the crosshead, to a maximum value at or near mid-stroke, the magnitude of the pressure due to the side rods the obliquity of which is constant, is always a fixed proportion of the forces transmitted by the side rods.

In order to prevent the tendency of the slipper or crosshead to rock, it is desirable that the line of action of these two centres of pressure should always lie in or approximately in the same horizontal plane.

In constructions of such engines heretofore adopted in which guides of cylindrical or bored-out type have been employed, the connection between the piston and the oblique side rods has been made outside the guide surfaces; this has necessitated the provision of longitudinal slots extending the full length of the guides, which slots cut away the part of the guide surface which is most effective in supporting the pressure due to the connecting rod obliquity. In other modifications of the Fullagar engine, the necessity for the said slots may be obviated by arranging the connection to the side rods below the crosshead pin and correspondingly increasing the length of the crosshead and slippers. In other modifications the connections of the side rods may be made inside the guide surfaces; this, however, necessitates arranging the guide surface some distance away from the gudgeon-pin.

The object of the present invention is to secure all the advantages which result in bringing the line of action of the two rectangularly disposed centres of pressure in a horizontal plane passing through or near the gudgeon-pin axis, without having either to cut away any effective part of the guide surfaces, or to place the guide surface some distance away from the engine centre; the construction according to the invention being particularly applicable to cylindrical guide surfaces which may form an extension of the cylinder bore.

The above object is attained according to the invention by so locating the transverse attachment member by which the side rods are connected to the crosshead that, whilst the said member is clear of the extreme end of the effective part of the fixed guide surface when the piston is at the end of its instroke, the centre of pressure due to the connecting rod obliquity, and the centre of pressure due to the side rods obliquity, are in, or approximately in, the same horizontal plane. In the preferred arrangement, the transverse member is located some distance away from the crosshead pin on the side of the latter remote from the piston, and it is also laterally displaced in relation to the axis of the cylinder so that the plane containing the axes of the side rods passes through or approximately through the point of intersection of the gudgeon-pin axis and the cylinder axis.

The transverse attachment member, which may be a cross bar or its equivalent, is connected to the crosshead by an extension of the said member, or by an extension of the crosshead, or the said extension may be in the nature of a distance piece detachable from the crosshead and/or from the said transverse member; or the said extension may be formed by an inwardly returned extension of the side rods themselves. The cross-bar and its equivalent and the extension piece may be arranged to lie wholly on one side of or to embrace the main connecting rod, and in some cases the crossbar may be formed integral with the piston itself.

I have illustrated my invention applied, by way of example, to an engine of the well known Fullagar type, in the accompanying drawings, in which:—

Figs. 1 to 8 show the invention applied to a crosshead connected to a crank by an oscillating connecting rod and also connected by a pair of oblique side rods to the upper piston in the adjacent cylinder,—

Figs. 1, 2 and 3 being elevations partly in section on a plane passing through the axis of the crank shaft, and Fig. 4 being an elevation partly in section, on a plane normal to the crank shaft axis; Fig. 1 shows the lower piston in its upper position, and Fig. 2 shows this piston in its lower position.

Figs. 3 and 4 show the lower piston in a position corresponding with the horizontal position of the crank; and Figs. 5 to 8 are corresponding plans in section on a horizontal plane passing through the gudgeon-pin axis.

Figs. 9 and 10 are views corresponding with Figs. 1 and 5, and show how, by a modification of the invention, the total vertical height of the engine may be reduced by cutting away certain portions of the guide surfaces which are not necessary to take the resultant reactions.

Figure 1:
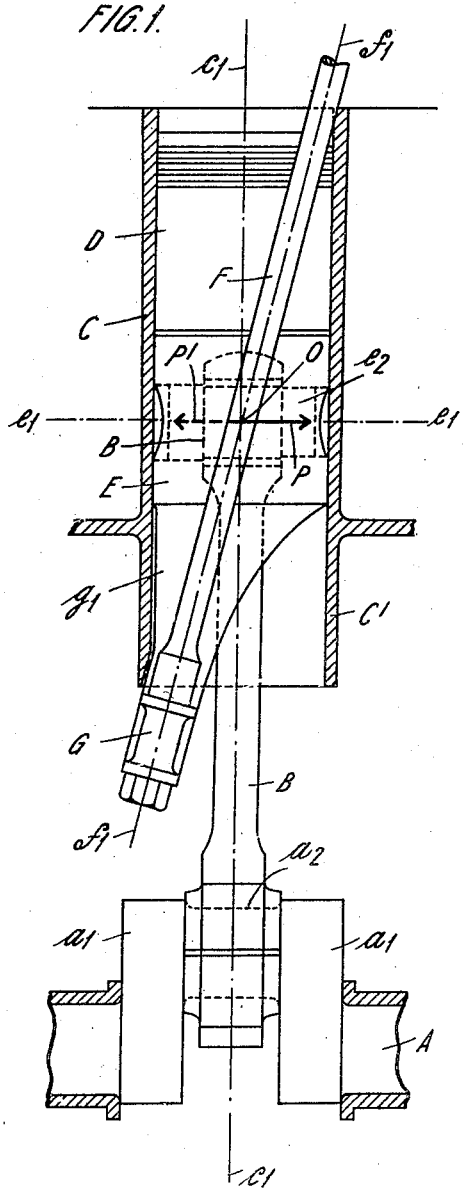
Figure 2:
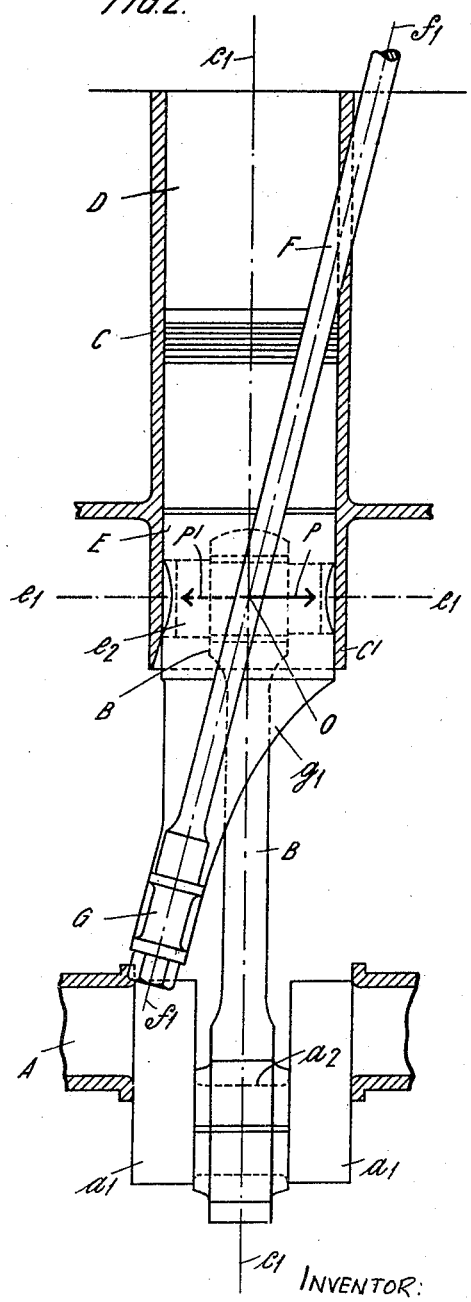
Figure 7:
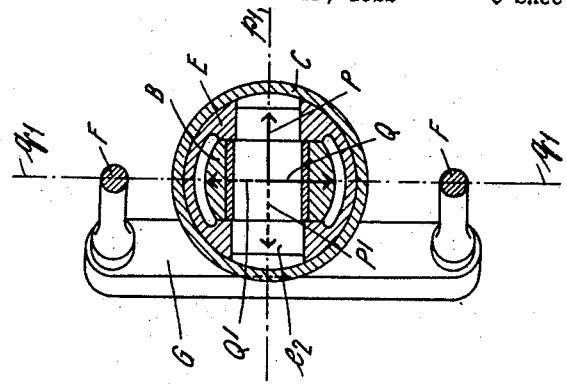
Figure 6:
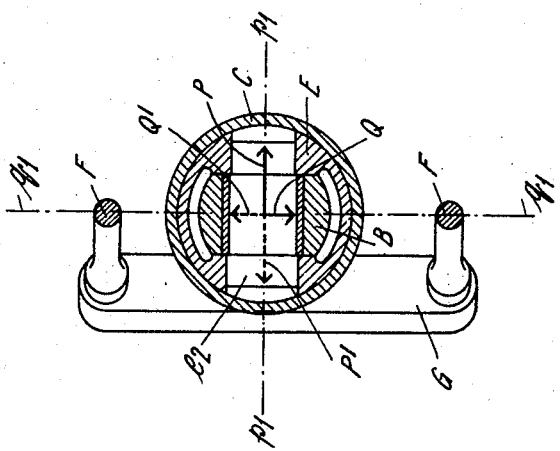
Figure 5:
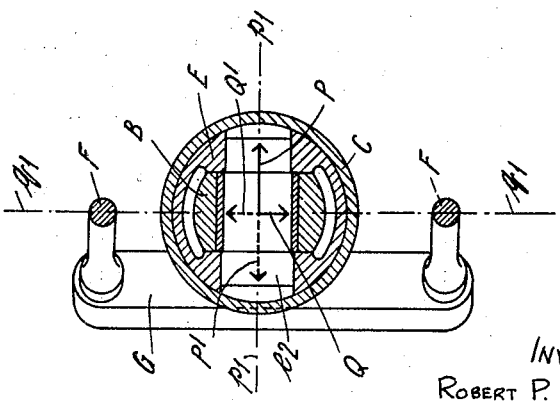

Fig. 11 which is a view similar to Fig. 1 shows the arrangement when two pairs of oppositely inclined oblique side rods have to be connected to the crosshead.

Figs. 12 and 13 show a modification of the invention in which the off-side of each guide is cut away from top to bottom with the exception of a small band near the lower end which, though not essential, ensures rigidity, the guides being of larger diameter than the cylinder and the axial length of the cut-away portion and the width thereof being such, and the distance pieces being so arranged that the piston and crosshead may be withdrawn at the lower end, thus greatly facilitating the erection and dismantling of these parts,—

Fig. 12 being an elevation in section on a plane passing through the axis of the crank shaft and showing the lower parts of the two associated cylinders and lower pistons, and the side rod connections therefor, and Fig. 13 being a plan of one of the said cylinders in section on a horizontal plane passing through the cross head gudgeon-pin.

Fig. 14 shows the application of the invention to the upper crossheads as well as the lower crossheads of a Fullagar engine.

Throughout the drawings, A is the crank shaft, $a^1$ the crank webs, $a^2$ the crank pins, B the connecting rod, C the cylinders, D the lower piston, E the crossheads, $e^2$ the crosshead gudgeon-pin, F the oblique rods, G the transverse member to which the pairs of rods are connected, and $g^1$ the distance piece between the latter and the crosshead.

Referring first to Figs. 1 to 8:—

In this case the crosshead E is of cylindrical configuration, and the guides $C^1$ are formed by an extension of the cylinder C, the guide surfaces being a continuation of the bore of the cylinder. The transverse member G, to the opposite ends of which the lower ends of the oblique rods F are secured is carried down sufficiently far below the gudgeon pin $e^2$ that when the latter is in its upper position as shown in Fig. 1, the upper edge of the transverse member is clear of the lower end of the guide surfaces, as shown also in dotted lines in Fig. 4. The transverse member G is not only lowered but is displaced laterally with reference to the axis of the cylinder C, so that the plane containing both axes $f^1$ of the side rods F intersects the axis $c^1$, $c^1$ of the cylinder C at the point O which is the point at which the axis $e^1$, $e^1$ of the gudgeon-pin $e^2$ also intersects the said axis $c^1$, $c^1$, and it is connected to the crosshead E by a distance piece $g^1$ which may be integral with either or both of the parts connected, but is usually made separate from these parts and bolted to them.

The centre of pressure P due to the obliquity of the side rods F, which is in the plane $p^1$, $p^1$, and the centre of pressure Q due to the obliquity of the connecting rod B, which is in the plane $q^1$, $q^1$, are in the construction described both in the same horizontal plane passing through $e^1$, $e^1$. The sectors showing these pressures are not to scale; for instance, the pressure Q would be practically nil in the positions shown in Figs. 1 and 5 and 2 and 6, and would be at or about its maximum when in the position shown in Figs. 3, 4, 7 and 8. It will be seen, therefore, that the resultant of P and Q will take up a different angular position in the plan view according to the different positions in its stroke of the crosshead E. The resultant under conditions of normal running will, however, be in the lower right hand quadrant for the one direction of motion of the engine, and in the upper right hand quadrant for the other direction of motion of the engine, the right hand half of the guide surface therefore is the really effective surface. In a Fullagar engine, the guide rods are practically always in tension, but where such guide rods are in compression, the line of pressure due to their obliquity would be represented by the dotted line $P^1$, in which case the resultant of $P^1$ and Q or $Q^1$ will be on the left hand half of the guide surface.

The arrangement shown in Figs. 1 to 8 permits of the use of a guide surface embracing 360° of the crosshead throughout the stroke of the latter. It will be understood, however, from the above description, that the left hand side of the guide surface, as shown in the drawings, is relatively of less importance than the right hand side, and it may therefore be cut away as shown at H, Figs. 9 and 10. This construction permits of the transverse member G being carried much clearer to the crosshead gudgeon-pin $e^2$ with a corresponding shortening of the distance piece $g^1$ and the connecting rod, and the reduction of the height of the engine.

In Fig. 11 the arrangement is substantially similar to that illustrated in Figs. 1 to 8, with the exception that two pairs of side rods, F and $F^1$, and two transverse members G and $G^1$, are fitted, and in this case it will be noted that the planes passing through the respective axes of the pairs of side rods intersect the axis $c^1$, $c^1$ of the cylinder at the point O, at which point the axis of the gudgeon-pin also intersects the axis $c^1$, $c^1$.

In Figs. 12 and 13, which show the lower parts of two associated cylinders of a Fullagar engine, with the lower pistons, crosshead, connecting rods, cranks and side rods, the bore of the guides is of greater diameter than that of the cylinder, and, owing to the relative unimportance of the off-side of the guide surfaces, the latter is, for the main part of its length, carried round through an angle K somewhat greater than two right angles. This leaves a gap $H^2$ on the off-side of width and length sufficiently great to permit of the removal therethrough of the piston D which in this modification is connected to the crosshead E by a removable distance piece $d^1$.

With the crank in its lowest position, and after the distance piece $d^1$ has been removed, the piston D can be lowered so that its ring portion leaves the cylinder. The piston can then be withdrawn horizontally through the gap $H^2$. In this modification the construction of the slipper portion of the crosshead is such as to permit of it also being withdrawn through the gap $H^2$, after withdrawal of the gudgeon-pin; or, if a split bearing be used at this point, after the removal of the bearing cap, and without the withdrawal of the gudgeon-pin. The crosshead or slipper E has a flat $e^3$ formed on the off-side so that when it is raised clear of the connecting rod and turned about a vertical axis through approximately 90°, it may be withdrawn in the same manner as the piston.

M is a closing plate to close in the gap $H^2$.

In Fig. 14 the invention is shown applied to both the upper and lower crossheads of a Fullagar engine, the planes containing the axes of the rods intersecting the axis $c^1$, $c^1$ of the cylinders at the point O for the lower crossheads, and at the point $O^1$ for the upper crossheads; this brings the centre of pressure $P^1$ of the upper crosshead at a suitable point in the length of the crossheads, and brings the centre of pressure P of the lower crossheads nearly into the same horizontal plane as that which passes through the centre line $e^1$, $e^1$ of the gudgeon-pin.

It is to be understood that whilst I have referred to the point O as being on the axis of the gudgeon-pin, which is desirable, it may be slightly above or slightly below the said axis without materially detracting from the efficiency of the arrangement.

The invention is applicable generally to cases in which a piston or the like has to be connected to a crank pin and to another moving part, and the details of construction may be modified in accordance with the type of engine to which the invention is applied.

Having now particularly described and ascertained the nature of my said invention, and in what manner the same is to be performed, I declare that what I claim is:—

1. In combination with a cylinder, a piston, a crosshead, a connecting rod and a crank, guide surfaces for the crosshead, a laterally disposed part adapted to reciprocate with but not in line with the crosshead, a pair of obliquely disposed side rods between which the said guide surfaces are located, the side rods connecting the said part to the crosshead, the points of attachment of the side rods to the crosshead being so arranged that the centre of pressure on the guide surface due to the connecting rod obliquity and the centre of pressure on the guide surface due to the side rod obliquity are approximately in the same transverse plane.

2. In combination with a cylinder, a piston, a crosshead, a connecting rod and a crank, guide surfaces for the crosshead, a laterally disposed part adapted to reciprocate with but not in line with the crosshead, a pair of obliquely disposed side rods between which the said guide surfaces are located, the side rods, connecting the said part to the crosshead, the points of attachment of the side rods to the crosshead being so arranged that the plane containing the axes of the pair of side rods passes approximately through the point at which the centre line of the pivotal connection between the connecting rod and the crosshead intersects the centre line of the cylinder whereby the centre of pressure on the guide surface due to the connecting rod obliquity and the centre of pressure on the guide surface due to the side rod obliquity are approximately in the same transverse plane.

3. In combination with a cylinder, a piston, a crosshead, a connecting rod and a crank, guide surfaces for the crosshead, a laterally disposed part adapted to reciprocate with but not in line with the crosshead, a pair of obliquely disposed side rods between which the said guide surfaces are located, the side rods connecting the said part to the crosshead, a transverse member attached to the crosshead and to the ends of which member the side rods are attached, said transverse member being in all positions clear of the effective part of the fixed guide surface, the side rods being so attached to the said transverse member that the plane containing the axes of a pair of side rods passes approximately through the point at which the centre line of the pivotal connection between the connecting rod and the crosshead intersects the centre line of the cylinder.

4. In combination with a cylinder, a piston, a connecting rod and a crank, a cylindrical crosshead, cylindrical guide surfaces for the crosshead, a laterally disposed part adapted to reciprocate with but not in line with the crosshead, a pair of obliquely disposed side rods between which the said guide surfaces are located, the side rods connecting the said part to the crosshead, the points of attachment of the side rods to the crosshead being so arranged that the plane containing the axes of the pair of side rods passes approximately through the point at which the centre line of the pivotal connections between the connecting rod and the crosshead intersects the centre line of the cylinder whereby the centre of pressure on the guide surface due to the connecting rod obliquity and the centre of pressure on the guide surface due to the side rod obliquity are approximately in the same transverse plane.

5. In combination with a cylinder, a piston, a crosshead, a connecting rod and a crank, a cylindrical crosshead, cylindrical guide surfaces for the crosshead, a laterally disposed part adapted to reciprocate with but not in line with the crosshead, a pair of obliquely disposed side rods between which the said guide surfaces are located, the side rods connecting the said part to the crosshead, the points of attachment of the side rods to the crosshead being so arranged that the plane containing the axes of the pair of side rods passes approximately through the point at which the centre line of the pivotal connection between the connecting rod and the crosshead intersects the centre line of the cylinder whereby the centre of pressure on the guide surfaces due to the connecting rod obliquity and the centre of pressure on the guide surface due to the side rod obliquity are approximately in the same transverse plane, a gap in the end portion of that side of the fixed cylindrical guide surface which is on the side of the cylinder centre line remote from the laterally disposed reciprocating part to which the side rods are attached.

6. In combination with the cylinder, a piston, a connecting rod and a crank, a cylindrical crosshead, cylindrical guide surfaces for the crosshead, a laterally disposed part adapted to reciprocate with but not in line with the crosshead, a pair of obliquely disposed side rods between which the said guide surfaces are located, the side rods connecting the said part to the crosshead, the points of attachment of the side rods to the crosshead being so arranged that the plane containing the axes of the pair of side rods passes approximately through the point at which the centre line of the pivotal connection between the connecting rod and the crosshead intersects the centre line of the cylinder whereby the centre of pressure on the guide surface due to the connecting rod obliquity and the centre of pressure on the guide surface due to the side rod obliquity are approximately in the same transverse plane, a slot in that side of the fixed guide surface which is on that side of the centre line of the cylinder remote from the laterally disposed reciprocating part to which the sides are attached, said slot being large enough to permit the withdrawal of the piston therethrough.

7. In combination with the cylinder, a piston, a connecting rod and a crank, a cylindrical crosshead, cylindrical guide surfaces for the crosshead, a laterally disposed part adapted to reciprocate with but not in line with the crosshead, a pair of obliquely disposed side rods between which the said guide surfaces are located, the side rods connecting the said part to the crosshead, the points of attachment of the side rods to the crosshead being so arranged that the plane containing the axes of the pair of side rods passes approximately through the point at which the centre line of the pivotal connection between the connecting rod and the crosshead intersects the centre line of the cylinder whereby the centre of pressure on the guide surface due to the connecting rod obliquity and the centre of pressure on the guide surface due to the side rod obliquity are approximately in the same transverse plane, a slot in that side of the fixed guide surface which is on that side of the centre line of the cylinder remote from the laterally disposed reciprocating part to which the sides are attached, said slot being large enough to permit the withdrawal of the piston therethrough; a detachable distance piece between the part of the crosshead to which the connecting rod is attached and the part to which the side rods are attached; a detachable distance piece between the crosshead and the piston, and flats on the cylindrical periphery of the crosshead so that the crosshead may be withdrawn through the said slot.

8. In combination, a pair of associated cylinders and pistons of an engine of the Fullagar type, connections between each of the lower pistons and the connecting rod and side rod thereof made in accordance with the preceding claims, crossheads connected to the respective upper pistons the guide surfaces of which are arranged between a pair of side rods connected thereto, a laterally disposed transverse member connected to each of the crossheads to the ends of which member the respective side rods are connected, the plane containing the axes of the side rods intersecting the centre line of the crosshead at a point approximately midway between the ends of the crosshead.

9. In combination, upper and lower cylinders, pistons working within the cylinders, a crank, connecting rods connecting said pistons with said crank, cross heads connected to the upper piston having guide surfaces, said surfaces being arranged between a pair of side rods connected thereto, a laterally disposed transverse member connected to each of the cross heads to the ends of which member the respective side rods are connected, the plane containing the axes of the side rods intersecting the centre line of the cross head at a point approximately midway between the ends of the cross head.

In witness whereof I set my hand in presence of two witnesses.

ROBERT PRICE KERR.

Witnesses:
JOSEPH G. HIRST,
JAS. C. MCRAE.